(12) United States Patent
Dashevskiy

(10) Patent No.: US 8,417,495 B2
(45) Date of Patent: Apr. 9, 2013

(54) METHOD OF TRAINING NEURAL NETWORK MODELS AND USING SAME FOR DRILLING WELLBORES

(75) Inventor: Dmitriy Dashevskiy, Nienhagen (DE)

(73) Assignee: Baker Hughes Incorporated, Houston, TX (US)

( * ) Notice: Subject to any disclaimer, the term of this patent is extended or adjusted under 35 U.S.C. 154(b) by 340 days.

(21) Appl. No.: 12/265,879

(22) Filed: Nov. 6, 2008

(65) Prior Publication Data
US 2009/0114445 A1 May 7, 2009

Related U.S. Application Data

(60) Provisional application No. 60/986,129, filed on Nov. 7, 2007.

(51) Int. Cl.
G06G 7/48 (2006.01)
G06F 15/18 (2006.01)
E21B 25/16 (2006.01)

(52) U.S. Cl. .......... 703/7; 703/10; 706/14; 175/45
(58) Field of Classification Search ............ 703/10, 703/7; 702/9
See application file for complete search history.

(56) References Cited

U.S. PATENT DOCUMENTS

| | | | |
|---|---|---|---|
| 5,444,619 A | 8/1995 | Hoskins et al. | |
| 5,842,149 A * | 11/1998 | Harrell et al. | 702/9 |
| 5,862,513 A * | 1/1999 | Mezzatesta et al. | 702/9 |
| 6,002,985 A | 12/1999 | Stephenson | |
| 6,021,377 A * | 2/2000 | Dubinsky et al. | 702/9 |
| 6,044,325 A | 3/2000 | Chakravarthy et al. | |
| 6,381,542 B1 * | 4/2002 | Zhang et al. | 702/7 |
| 6,424,919 B1 * | 7/2002 | Moran et al. | 702/6 |
| 6,732,052 B2 * | 5/2004 | Macdonald et al. | 702/6 |
| 6,754,589 B2 | 6/2004 | Bush | |
| 7,020,597 B2 * | 3/2006 | Oliver et al. | 703/7 |
| 7,899,658 B2 * | 3/2011 | Oliver et al. | 703/10 |
| 8,214,188 B2 * | 7/2012 | Bailey et al. | 703/10 |

(Continued)

OTHER PUBLICATIONS

Application of Neural Networks for Predictive Control in Drilling Dynamics by D. Dashevskiy et al, SPE Doc #SPE 56442, Year 1999, pp. 1-9.*

(Continued)

*Primary Examiner* — Omar Fernandez Rivas
*Assistant Examiner* — Akash Saxena
(74) *Attorney, Agent, or Firm* — Cantor Colburn LLP

(57) ABSTRACT

A method of creating and using a neural network model for wellbore operations is disclosed. The method, in one aspect, may include defining a plurality of a wellbore parameter; calculating a plurality of output values of a tool operating parameter using the plurality of values of the wellbore parameter as input to a preexisting model; and obtaining a neural network model by using the plurality of values of the wellbore parameter and the calculated plurality of output values of the tool operating parameter. The neural network may be utilized for any suitable wellbore operation, including in conjunction with a drilling assembly for drilling a wellbore.

22 Claims, 4 Drawing Sheets

U.S. PATENT DOCUMENTS

| | | |
|---|---|---|
| 2002/0120401 A1 | 8/2002 | Macdonald et al. |
| 2005/0010382 A1* | 1/2005 | Oliver et al. ............... 703/7 |
| 2006/0149518 A1* | 7/2006 | Oliver et al. ............... 703/7 |
| 2007/0011115 A1* | 1/2007 | Smith et al. ............... 706/15 |
| 2007/0021857 A1* | 1/2007 | Huang ............... 703/7 |
| 2007/0185696 A1* | 8/2007 | Moran et al. ............... 703/10 |
| 2008/0262810 A1* | 10/2008 | Moran et al. ............... 703/10 |
| 2008/0262816 A1 | 10/2008 | Lontka |
| 2008/0306892 A1* | 12/2008 | Crossley et al. ............... 706/16 |
| 2009/0114445 A1* | 5/2009 | Dashevskiy ............... 175/45 |
| 2010/0032165 A1* | 2/2010 | Bailey et al. ............... 703/1 |
| 2011/0153296 A1* | 6/2011 | Sadlier et al. ............... 703/7 |

OTHER PUBLICATIONS

A New Approach to Calculate Stress Concentration Factors: Artificial Neural Networks by Ademar A. Cardoso et al, Proceedings of the Eighth (1998) International Offshore and Polar Engineering Conference Montreal, Canada, May 24-29, 1998, pp. 22-26.*

* cited by examiner

METHOD OF TRAINING NEURAL NETWORK MODELS AND USING SAME FOR DRILLING WELLBORES

CROSS-REFERENCE TO RELATED APPLICATION

This application takes priority from U.S. Provisional Application Ser. No. 60/986,129, filed on Nov. 7, 2007, which is incorporated herein by reference in its entirety.

BACKGROUND OF THE DISCLOSURE

1. Field of the Disclosure

This disclosure relates generally to methods and apparatus for use in wellbores.

2. Description of the Related Art

Wellbores or boreholes are drilled in the earth's subsurface formations for the production of hydrocarbons (oil and gas), utilizing a rig (land or offshore) and a drill string. The drill string includes a tubing (jointed pipes or a coiled tubing) and a drilling assembly (also referred to as a "bottom hole assembly" or "BHA"). To drill the wellbore, a drill bit attached to the bottom of the BHA is rotated by rotating the drill string at the surface and/or by a drilling motor (also referred to as "mud motor") disposed in the BHA. The BHA typically carries a variety of devices useful in drilling the wellbores. Such devices may include sensors for measuring inclination and azimuth of the BHA assembly, force application devices that apply force on the wellbore to change the drilling direction, etc. The BHA also carries a variety of downhole tools, referred to as the logging-while-drilling ("LWD") or measurement-while-drilling ("MWD") tools, for estimating parameters of the formation surrounding the wellbore. The BHA often exceeds 30 meters in length and the various tools in the BHA carry sensitive sensors and electronic components that can be damaged due to great stress on the BHA during drilling of the wellbore. Weight-on-bit (WOB), BHA rotational speed (RPM) and drilling direction are controlled to drill the wellbore at desired rates of penetration along a desired path and to maintain the BHA operating parameters, such as bending, stress, and deflection, etc. within acceptable limits. Preexisting simulation software or models, referred to as the "engineering software or models" are often used to simulate the BHA operating parameters and the simulation results are then used to choose the optimal range of drilling parameters, such as WOB and RPM. Computing BHA operating parameters using preexisting simulation models generally take a relatively long time. Such models are generally not suitable for computing the BHA operating parameters during drilling of the wellbore because the downhole drilling conditions often changes continually. Thus, there is a need for a model that can provide simulation results relating to one or more BHA operating parameters during the drilling operations.

SUMMARY OF THE DISCLOSURE

In one aspect, a method of operating a tool in a wellbore is disclosed. The method may include: defining at least one value of at least one tool parameter; defining a plurality of values of at least one wellbore parameter; calculating a plurality of output values of at least one tool operating parameter using the at least one value of the at least one tool parameter and the plurality of values of the at least one wellbore parameter as inputs to a preexisting model; and obtaining a neural network model by using the plurality of values of the at least one wellbore parameter and the calculated plurality of output values of the tool operating parameter.

In another aspect, an apparatus for use in a wellbore is disclosed that in one embodiment may include: a data storage medium; a neural network model stored in the data storage medium, which neural network model is created by: obtaining a plurality of values of a tool operating parameter using as input to a preexisting model at least one value of at least one tool parameter and a plurality of values of at least one wellbore parameter; and creating the neural network model by using the plurality of values for the at least one wellbore parameter and the plurality of output values of the at least one tool operating parameter.

Examples of the more important features of a method and an apparatus using a neural network model have been summarized (albeit rather broadly) in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For detailed understanding of the present disclosure, reference should be made to the following detailed description of the embodiments, taken in conjunction with the accompanying drawing in which like elements are generally designated by like numerals, wherein.

DETAILED DESCRIPTION

Figure 1:
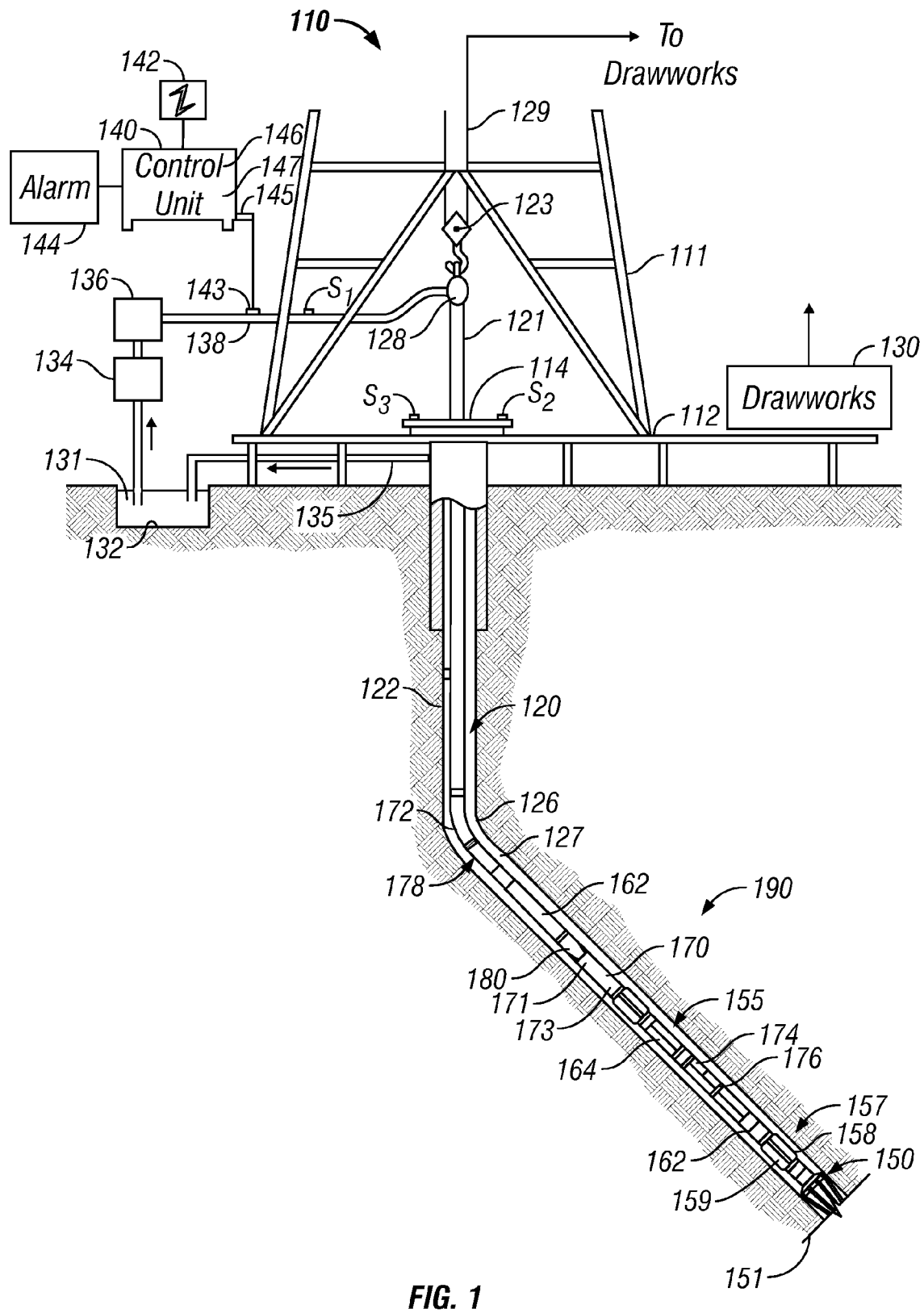
FIG. 1 shows a schematic illustration of an exemplary drilling system that includes a drilling assembly made according to one aspect of the disclosure for drilling wellbores.

FIG. 1 shows a schematic diagram of a drilling system 110 for drilling a wellbore 126 in an earth formation 160 and for estimating properties or characteristics of interests of the formation during the drilling of the wellbore 126. The drilling system 100 includes a drill string 120 that comprises a drilling assembly or BHA 190 attached to a bottom end of a drilling tubular 122 (made of jointed drill pipes). The drilling system 100 is shown to include a conventional derrick 111 erected on a floor 112 that supports a rotary table 114 that is rotated by a prime mover, such as an electric motor (not shown) to rotate the drilling tubular 122 at a desired rotational speed. The drilling tubular 122 is typically made up of jointed metallic pipe sections and extends downward from the rotary table 114 into the wellbore 126. A drill bit 150, attached to the end of the BHA 190, disintegrates the geological formations when it is rotated to drill the borehole 126. The drill string 120 is coupled to a drawworks 130 via a Kelly joint 121, swivel 128 and line 129 through a pulley 123. During the drilling of the wellbore, draw works 130 controls the weight on bit, which affects the rate of penetration.

During drilling operations, a suitable drilling fluid or mud 131 from a source or mud pit 132 is circulated under pressure through the drill string 120 by a mud pump 134. The drilling fluid 131 passes from the mud pump 134 into the drilling tubular 122 via a desurger 136 and a fluid line 138. The drilling fluid 131 is discharged at the wellbore bottom 151 through an opening in the drill bit 150. The drilling fluid 131 circulates uphole through the annular space 127 between the drill string 120 and the wellbore 126 and returns to the mud pit 132 via a return line 135. A sensor $S_1$ in the line 138 provides information about the fluid flow rate. A surface torque sensor $S_2$ and a sensor $S_3$ associated with the drill string 120 respectively provide information about the torque and the rotational speed of the drill string. Additionally, one or more sensors (not shown) associated with line 129 are typically used to provide the hook load of the drill string 120 and information about other desired drilling parameters relating to the drilling of the wellbore 126.

In some applications, the drill bit 150 is rotated by only rotating the drill pipe 122. However, in other applications, a drilling motor 155 (also referred to as the "mud motor") disposed in the drilling assembly 190 is used to rotate the drill bit 150 and/or to superimpose or supplement the rotational speed of the drill string. In either case, the rate of penetration (ROP) of the drill bit 150 into the wellbore 126 for a given formation and a BHA largely depends upon the weight on bit and the drill bit rotational speed.

The system 110 includes a surface control unit 140 configured to provide information relating to the drilling operations and to control desired drilling operations. In one aspect, the surface control unit 140 may be a computer-based system that includes one or more processors 146 (such as microprocessors), one or more data storage devices 147 (such as solid state-memory, hard drive, tape drive, etc.), display units and other interface circuitry. Computer programs, algorithms and models for use by the processors 146 in the control unit 140 may be stored in the data storage device 147 accessible to the processors 146. The surface control unit 140 also may interact with one or more remote control units 142, which also may be a computer-based system, via any suitable data communication link 141, such as the Ethernet, Internet, etc. In one aspect, signals from the downhole sensors and devices (described later) are received by the control unit 140, via one or more via sensors, such as sensors 143 or via direct links, such as electrical conductors, fiber optic links, wireless links, etc. The surface control unit 140 processes the received data and signals according to programs, algorithms and models provided to the control unit and provides information about drilling parameters (such as WOB, RPM, fluid flow rate, hook load, etc.) and formation parameters (such as resistivity, acoustic properties, porosity, permeability, etc.). The surface control unit 140 records such and other information on suitable data storage devices and displays information relating to certain desired drilling parameters and any other selected information on a display 144, which information may be utilized by the control unit 140 and/or a drilling operator at the surface to control one or more aspects of the drilling system 110.

Still referring to FIG. 1, BHA 190 may include a force application device 157 that may contain a plurality of independently-controlled force application members 158, each of which may be configured to apply a desired amount of force on the wellbore wall to alter the drilling direction and/or to maintain the drilling of the wellbore 126 along a desired direction. A sensor 159 associated with each such force application member 158 provides signals relating to the force applied by its associated member. The drilling assembly 190 also may include a variety of sensors (collectively designated herein by numeral 162) located at selected locations on the drilling assembly that provide information about the various drilling assembly operating parameters, including but not limited to: bending moment, stress, vibration, stick-slip, tilt, inclination and azimuth. Strain gauges, magnetic-coded sensors, accelerometers, etc. may be utilized to determine bending moments, stress, vibration, whirl, stick slip and other physical drilling assembly operating parameters during drilling of the wellbore. Accelerometers, magnetometers and gyroscopic devices (collectively designated by numeral 174) may be utilized for determining inclination, azimuth and tool face position of the BHA 190. In one aspect, a controller 170 carried by the BHA processes the signals from the various sensors 162 and calculates in-situ the values of the BHA operating parameters using programs, algorithms and models provided to the downhole control unit 170. In another aspect, the sensor signals may be partially processed downhole by the downhole control unit 170 and then sent to the surface controller 140 for further processing.

Still referring to FIG. 1, the drilling assembly 190 may further include any desired measurement-while-drilling (MWD) devices or tools (also referred to as logging-while-drilling or "LWD" tools) for estimating or determining various properties of the formation 160. Such tools may include resistivity tools, acoustic tools, nuclear magnetic resonance (NMR) tools, gamma ray tools, nuclear logging tools, formation testing tools and other desired tools. Each such tool may process signals and data according to programmed instructions and provide information about certain properties of the formation.

Still referring to FIG. 1, the drilling assembly 190 further includes a telemetry unit 172 that establishes two-way data communication between the devices in the drilling assembly and a surface device, such as the surface control unit 140. Any suitable telemetry system may be used for the purpose of this disclosure, including, but not limited to, mud pulse telemetry, acoustic telemetry, electromagnetic telemetry, wired-pipe telemetry, or any other suitable telemetry system. The wired-pipe telemetry system may include: drill pipes made of jointed tubulars in which electrical conductors or fiber optic cables are run along individual drill pipe sections and wherein communication between pipe sections is established by mechanical coupling, electromagnetic coupling, fiber optic couplings, acoustic couplings, or wireless connections across pipe sections; or coiled tubings in which electrical or fiber optic fibers are run along the length of the tubing. The drilling system described thus far is a land-based system. The systems, apparatus and methods described herein are equally applicable to offshore drilling systems, including systems that use drill pipe and coiled tubing for conveying the drilling assembly into the wellbore.

During drilling of the wellbore, it is desirable to obtain information about certain physical properties or parameters of the BHA or a portion thereof during drilling, which parameters are referred herein as the drilling assembly or BHA or tool "operating parameters." The drilling assembly or tool operating parameters may include, but are not limited to, bending moment distribution, stress distribution, vibration distribution, oscillation profile, natural frequencies, tilt, deflection, whirl, stick slip, tool fatigue, and tool health. Simulation software or models (sometimes referred to as the "engineering software" or models) are often used at the surface in a laboratory environment to simulate the operating parameters for a particular drilling assembly configuration or a portion thereof, based on the geometry of a well to be drilled using the particular drilling assembly. Such simulation software typically take a substantial amount of time to calculate the value of each drilling assembly or tool operating parameter, for a given wellbore geometry, dynamic drilling parameters (such as rotational speed of the drill pipe and/or drill bit, weight on bit, force applied on the drilling assembly to steer the drill bit along a particular direction, etc.). Therefore, such software are generally not utilized for in-situ determination of the drilling assembly operating parameters during drilling of the wellbores. The disclosure herein provides apparatus and methods that utilize neural network models for estimating one or more drilling assembly operating parameters during drilling of wellbores. In one aspect, a neural network model 180 is created or trained using the results obtained from a known (preexisting) simulation or engineering model. In one aspect, the neural network model 180 may then be stored in a suitable computer-readable medium 173 accessible to a processor 171 of the control unit 170 in the drilling assembly 190 for calculating one or more drilling assembly operating parameters during drilling of wellbores. In another aspect, the neural network model 180 may be stored in the computer-readable medium 147 accessible to the processor 146 of the surface control unit 140 or it may be stored partially in the computer-readable medium 173 and partially in 147. The downhole control unit 170 and/or surface control unit 140 utilizing the neural network model 180 is typically capable of estimating the values of the desired drilling assembly operating parameters within sufficiently small time periods such that the system 110 or an operator at the surface may effectively utilize the estimated values of the drilling assembly operating parameters to alter drilling operations to drill the wellbore along a desired well path. The neural network model computed-values may be utilized to take one or more actions during drilling of the wellbore, such as changing the drilling direction, changing the force applied by a particular force application member on the wellbore inside, changing RPM of the drill string and/or drill bit, changing WOB, changing drilling fluid supply rate, etc. The methods of creating a neural network model for use with a drilling assembly are described in more detail in reference to FIGS. 2-5.

Figure 2:
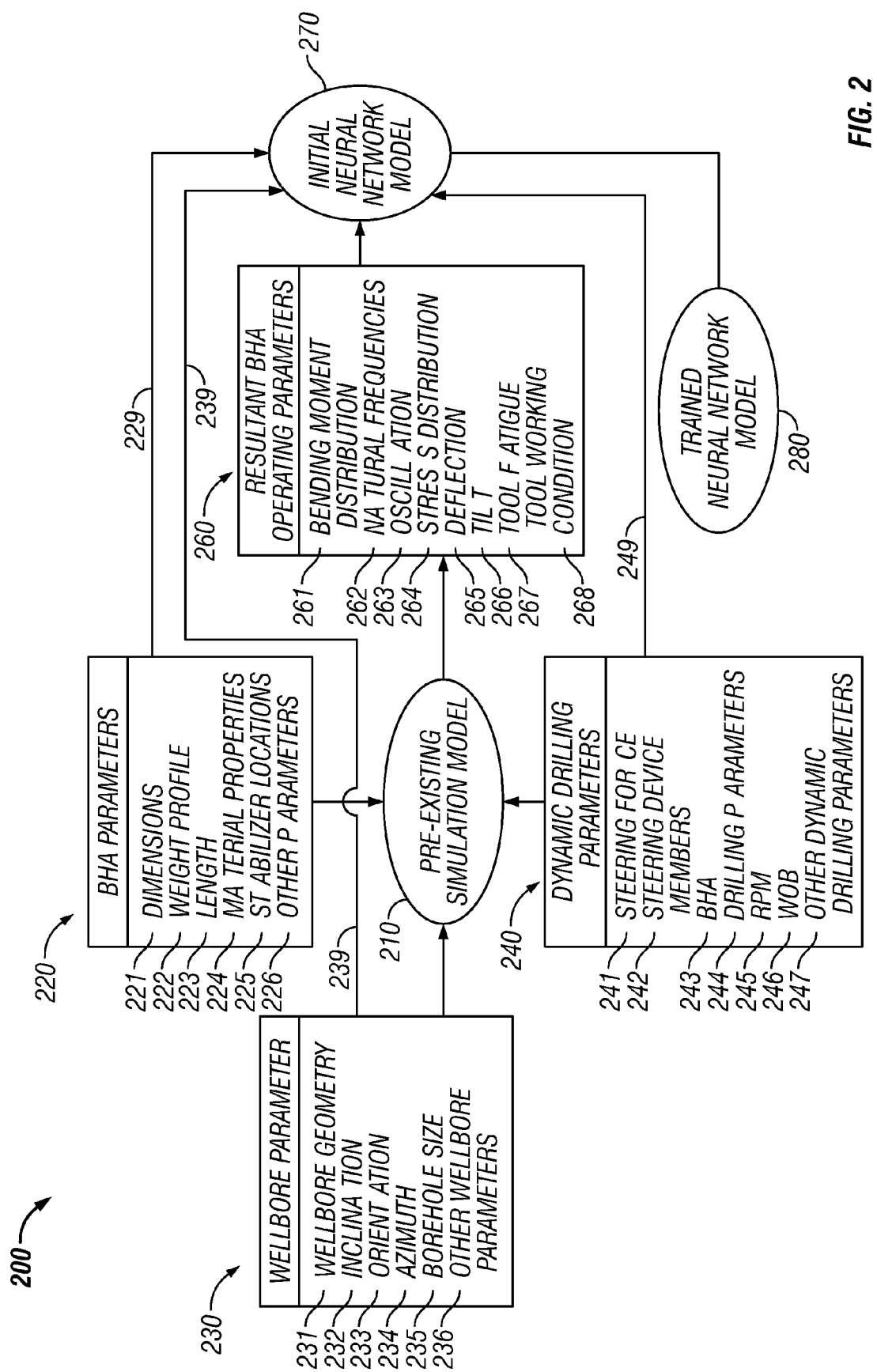
FIG. 2 shows an exemplary flow diagram for creating or training a neural network model for a particular drilling assembly using a simulation or engineering applications model, according to one aspect of the disclosure.
Figure 3:
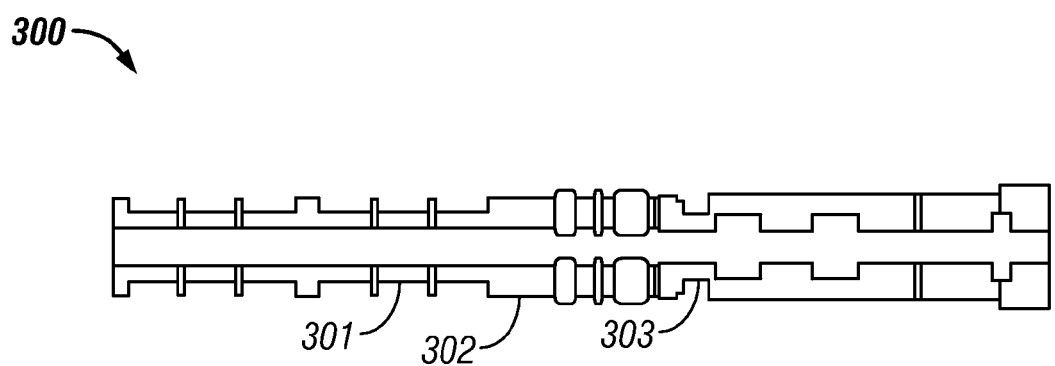
FIG. 3 shows an exemplary configuration of a particular drilling assembly for which a neural network may be trained according to a method disclosed herein, including the methods shown in FIG. 2.

FIG. 2 shows an exemplary flow diagram of a computer system 200 that may be utilized for training or creating a neural network model 280 for a particular drilling assembly configuration or a portion thereof or another downhole tool by utilizing results obtained from a known simulation model 210, according to one aspect of the disclosure. The simulation model 210 may be any suitable model that is designed to calculate or provide values for one or more drilling assembly operating parameters. In one aspect, the simulation model 210 calculates the values of the BHA operating parameters based on certain inputs. One of the inputs to the simulation model 210 may include values of one or more BHA parameters 220. The BHA parameters generally refer to physical parameters, such as BHA dimensions 221 (such as outside diameters of various BHA sections, through bore dimensions corresponding to the various sections of the BHA, etc.), weight or weight profile (distribution) 222 of the BHA, overall length of the BHA and/or the lengths 223 of one or more sections of the BHA, material properties 224 of one or more sections of the BHA (e.g., properties of materials that are used in the different BHA sections, such as steel, titanium, composite materials, hybrid materials, etc.), locations of the stabilizers 225 and other desired physical BHA parameters 226. FIG. 3 shows an exemplary configuration of a BHA 300, wherein certain BHA sections, such as sections 301, 302 and 303 are shown to have different lengths, inside and outside dimensions. The material properties of different BHA sections are generally known from technical data and/or or tests performed on the materials used. In general, the BHA parameters are physical in nature and are fixed for each BHA type. The simulation model 210 also may receive as input the values of one or more wellbore parameters 230. The wellbore parameters are generally referred to herein as the parameters that relate to the geometry 231 of the wellbore to be drilled utilizing the BHA. The wellbore parameters 230 may include, but are not limited to, inclination 232 of the wellbore, orientation 233 of the wellbore, azimuth 234, size (such as inside diameter) 235 of the wellbore, curvature, and any other desired parameter 236. Wellbore parameters 230 are typically dynamic in nature because the well may include vertical sections, straight inclined sections, curved sections and horizontal sections corresponding to different wellbore depths.

Another type of input provided to the simulation model 210 may be the values of one or more dynamic drilling parameters 240. The dynamic drilling parameters are generally referred to herein as the parameters controlled by an operator or the system 110 to drill the wellbore using the drilling assembly. The dynamic drilling parameters 240 may include steering force 241 applied to alter drilling direction, which force may be applied by a steering device 242 or a force exerted by other BHA steering devices 243, such as by knuckle joints. The dynamic drilling parameters 240 may also include drilling parameters 244, such as rotational speed (RPM) 245 of the drilling assembly, weight on bit 246, and other desired parameters 247. The values of the dynamic drilling parameters may be obtained for different well depths from prior wellbore drilling data and/or may be estimated based on the wellbore geometry, type of drilling assembly, rock formations, etc.

In one aspect, the computer system 200 using the simulation model 210 and the inputs 220, 230 and 240 calculates the values of the selected drilling assembly operating parameters for each set of input values. In one aspect, the computer system 200 may use the preexisting simulation model 210 to perform a simulation and provide as an output a value of a selected BHA operating parameter corresponding to each value of the wellbore parameter. For example, when the selected BHA operating parameter is the bending moment distribution of the BHA, then the computer may provide one bending moment profile corresponding to each wellbore parameter input. If combinations of two or more wellbore parameters are used as the input, the simulation may provide a separate value for the BHA operating parameter for each such combination. Therefore, in one aspect, the result 212 of the computer simulation using the model 210 may provide a set of values 260 for each BHA operating parameter corresponding to a variety of input value combinations of one or more wellbore parameters and the dynamic drilling parameters. The BHA operating parameters 260 may include, but are not limited to, bending moment distribution 261, natural frequencies 262, oscillation 263, stress distribution 264, deflection 265, tilt 266, tool fatigue 267 and a working condition of the BHA 268.

Figure 4:
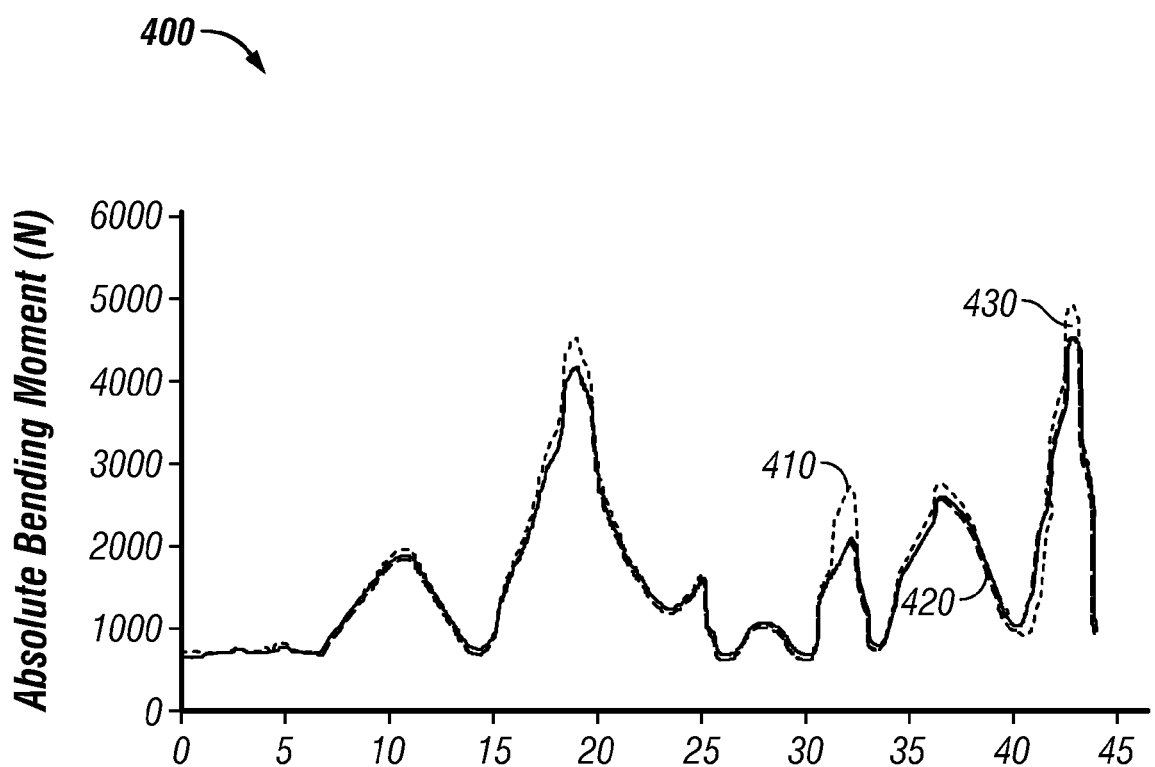
FIG. 4 shows a graph showing the values of a drilling assembly parameter (absolute bending moment) produced by the simulation model and the trained neural network model created according to one method of this disclosure.

The results or output values 260 for the BHA operating parameters are then utilized to train an initial neural network model 270 for the particular BHA. One set of input values to the initial neural network model 270 may be the same BHA parameter values 220 as provided to the simulation model 210, as shown by line 229. Another set of input values to the initial neural network 270 may be the values for the wellbore parameters 230 and the dynamic drilling parameters 240. The expected results from the initial neural network model 270 are the values of the drilling assembly operating parameters. Thus for a given set of input values of wellbore and/or dynamic drilling parameters to the neural network model 270, the neural network model 270 is expected to produce the same value as produced by the simulation model 210. The neural network is trained to produce the values for the drilling assembly operating parameters that correspond to the values provided by the simulation model 210 by iterating the training process for a large number of input value sets. After a sufficient number of iterations, the neural network model 270 becomes a trained neural network model 280. The trained neural network model 280 may then be used to simulate or estimate the drilling assembly operating parameter values to determine the variance between the results provided by the preexisting simulation model 210 and the trained neural network model 280. FIG. 4 shows an exemplary graph 400 of the absolute bending moments 410 produced by the simulation model 210 and the absolute bending moment 420 produced by the trained neural network model 280 for the exemplary drilling assembly shown in FIG. 3. In the particular example of FIG. 4, the variance or error 430 between the two graphs 410 and 420 is relatively small and thus the trained neural network 280 may be deemed ready for use in a drilling assembly, such as shown in FIG. 1 for drilling a particular wellbore. Similar comparisons may be performed for other desired drilling assembly operating parameters to determine the efficacy of the trained neural network model before deploying it for use in drilling a wellbore. If the variance is more than a desired amount, the neural network may be trained further using additional sets of inputs or in the alternative a different initial neural network model may be selected. The initial neural network model is typically a multi-level neural network and the use of such networks is known and thus is not described in detail herein.

Figure 5:
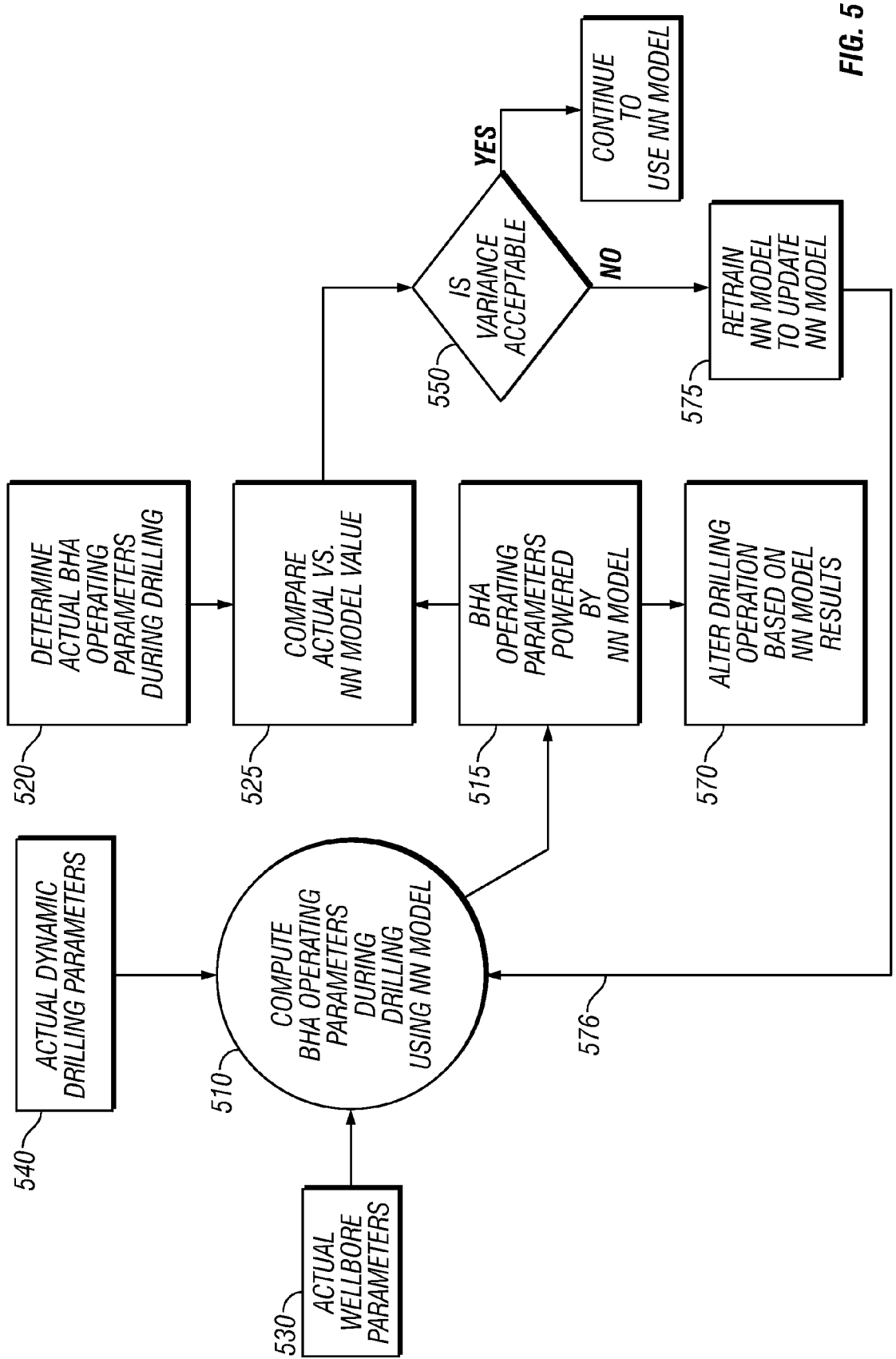
FIG. 5 shows a flow diagram for use of a trained neural network during drilling of a wellbore.

FIG. 5 shows a flow diagram 500 illustrating a method of utilizing a trained neural network model 510 obtained in accordance with one or more aspects described herein with a suitable BHA for drilling a wellbore. Referring to FIGS. 1 and 5, when the BHA 190 is in the wellbore, a processor associated with the downhole controller 170 and/or the surface controller 140 uses one or more actual wellbore parameters 530 as input to the trained neural network model 510 and determines simulated values 515 for one or more BHA operating parameters in real time. As noted before, the BHA operating parameters may include, but are not limited to, bending moment distribution 261, natural frequencies 262, oscillation 263, stress distribution 264, deflection 265, tilt 266, tool fatigue 267 and a working condition of the BHA 268. Thus, neural network model may provide real-time values of any of the desired BHA operating parameters, which may be utilized to take one or more actions during drilling of the wellbore. The BHA operating parameters, such as tool fatigue and the working condition may also be utilized to estimate the current health of the BHA. Depending upon the real-time estimated BHA health, one or more drilling dynamic parameters may be altered to extend the life of the BHA. Alternatively, when the estimated BHA health falls outside a selected criterion, the BHA may be tripped out of the wellbore for inspection, repair or replacement. The selected criterion may be a value or range of values or the system may compare a preselected BHA health profile with the real-time BHA health profile to determine the desired action to be taken to improve drilling efficiency. In another aspect, one or more values of one or more dynamic drilling parameters 540 (force applied on the wellbore wall, for example) also may be input to the neural network model 510 along with the one or more values of the wellbore parameters 530. The processor or an operator at the surface compares the neural network model generated value of the drilling assembly operating parameter with a predetermined norm (which may be a single value or a range of values). When the comparison of the neural network simulated results 515 indicates that the computed value of the selected drilling assembly operating parameter is outside the norm, the drilling system 100 may alter one or more drilling parameters, such as drill bit and/or drill string rotational speed, weight-on-bit, drilling fluid flow rate, force applied by the force application device, or a combination of such parameters, etc., as shown by block 570. This process may be continued until the results computed by the neural network model 510 fall within the acceptable norm. The wellbore parameter values and/or the desired dynamic drilling parameter values or ranges provided for use by the neural network model during drilling of the wellbore may be stored in a memory carried by the BHA instead of the actual values computed during the drilling of the wellbore or any combination of the actual and stored values. Additionally, a trained neural network model may also be configured to provide an expected response relating to "healthy tool." Discrepancies between the neural network model output and measured values may be analyzed to evaluate the "health problems" of a tool.

In another aspect, the system 110 may compute the actual values of one or more BHA operating parameters (bending moment, stress, tilt, etc. for example) 520 at one or more selected locations in the BHA. The processor 171 and/or 146 may (as shown in block 525) determine the variance or difference between the actual computed values of the BHA operating parameter and the neural network model simulated BHA operating parameter values. If the difference between an actual computed BHA operating parameter and the corresponding value provided by the neural network model 510 is within an acceptable norm, the neural network may be used for further drilling of the wellbore. If the difference is greater that an acceptable norm as shown by decision block 550, the neural network model 510 may be retrained using the actually computed BHA operating parameter values as shown by block 575. The retrained neural network model is provided to the processor as shown by communication line 576 and then used as the neural network 510 for further drilling of the wellbore. The retraining of the neural network 510 may be done by the controller 170 and/or controller 140 during drilling of the wellbore or it may be done remotely and then transmitted to the controller 170 and/or 140. Thus, the neural network may be continually updated as the drilling progresses.

Thus in one aspect, a method for a wellbore operation is disclosed, in which the method: defines at least one value of at least one tool parameter; defines a plurality of values of at least one wellbore parameter; calculates a plurality of output values of at least one tool operating parameter using the at least one value of the at least one tool parameter and the plurality of values of the at least one wellbore parameter as inputs to a preexisting model; obtains or trains a neural network model by using the plurality of values of the at least one wellbore parameter and the calculated plurality of output values of the tool operating parameter; and records the neural network model in a suitable medium for use for operating the tool in the wellbore.

The tool parameter may be selected from any physical aspect of the tool, including, but not limited to: (i) the length of the tool; (ii) the weight of the tool; (iii) the weight distribution of the tool; (iv) the diameter of a section of the tool; and (v) an outside dimension or profile of the tool. The wellbore parameters may include any parameter or combination of parameters relating to the wellbore, including, but not limited to its: (i) inclination; (ii) geometry; (iii) azimuth; (iv) wellbore inside dimensions; (v) curvature; and (vi) orientation. The tool operating parameters may include, but are not limited to: (i) bending moment; (ii) stress; (iii) vibration; (iv) whirl; (v) stick-slip; (vi) oscillation; (vii) deflection; (viii) tilt; (ix) natural frequencies; (x) tool fatigue; and (xi) tool health.

The method may further compute a value of the at least one tool operating parameter when the tool is in use in the wellbore ("in-situ value") using as input a value of the wellbore parameter into the neural network; and alter a tool operation in response to the in-situ value when the tool is in use in the wellbore. To obtain the neural model, the method may use as input one or more variable tool parameters. The variable tool parameter may be any tool parameter that varies, including, but not limited to: (i) a side force applied by the tool to the wellbore; (ii) direction of a side force applied by the tool to the wellbore; and (iii) stiffness of the tool.

The method may further: compute a value of the tool operating parameter using the neural network model during drilling of the wellbore; and alter a tool operation during drilling of the wellbore when the computed value of the tool parameter using the neural network is outside a selected criterion. Altering a tool operation may include one or more of the following, but is not limited to: (i) drilling direction; (ii) force applied on a wellbore inner surface by a force application device to drill the wellbore along a desired path; (iii) weight on bit; (iv) rotational speed of a drilling bit; (v) rotational speed of a drill string; (vi) drilling motor rotational speed that drives a drill bit; (vii) inclination; (viii) azimuth; and (ix) orientation.

The method may also compute a value of the at least one tool operating parameter when the tool is in use in the wellbore ("in-situ value") using as input a value of the wellbore parameter into the neural network; measure an actual value of the at least one tool operating parameter using a sensor downhole; and update the neural network model using the actual computed value. The at least one value of the at least one tool parameter may be a fixed number and the plurality of values of the at least one wellbore parameter may fall within a selected range of values.

In another aspect, the method may include creating a neural network for use in a wellbore operation, which method may: define at least one fixed value for a plurality of tool parameters; define a plurality of values for at least one wellbore parameter; compute a first set of output values for at least one tool operating parameter using as input into a preexisting model the at least one fixed value for each of the plurality of tool parameters and the plurality of values for the at least one wellbore parameter; create the neural network model for computing a second set of output values of the at least one tool operating parameter using the defined plurality of values for the at least one wellbore parameter and the first set of output values; and record the created neural network model in a suitable medium. The method may further: define a range of values for the at least one wellbore parameter for use during drilling of the wellbore using the tool; and compute the second set of output values during drilling of the wellbore using as input to the neural network model values from the defined range of values for the at least one wellbore parameter. Additionally, the method may further: measure a value of the at least one tool operating parameter using a sensor in the wellbore during the drilling of the wellbore (in-situ value); and update the neural network model using the in-situ value. The updating of the neural network model may include updating the neural network model in a manner that is one of: (i) in the tool during drilling of the wellbore; and (ii) at the surface during drilling of the wellbore. In the method, the at least one wellbore parameter may be, but not limited to one or more of: (i) inclination; (ii) wellbore geometry; (iii) a wellbore inside dimension; (iv) azimuth; and (v) curvature. Also, in this method, the at least one tool operating parameter may be, but not limited to: (i) bending moment; (ii) stress; (iii) vibration; (iv) whirl; (v) stick-slip; (vi) oscillation; (vii) deflection; and (viii) tilt. In these methods, the method may create the neural network model by using as input a variable tool parameter, which may be any suitable parameter, including, but not limited to: (i) a side force applied by the tool to the wellbore; (ii) direction of a side force applied by the tool to the wellbore; and (iii) stiffness of the tool.

In another aspect, an apparatus is disclosed that may contain: a drilling assembly configured to drill the wellbore; a data storage medium; a neural network model stored in the data storage medium, which neural network model is created by: calculating a plurality of output values for a tool operating parameter by using as input to a preexisting model at least one value of at least one tool parameter and a plurality of values of at least one wellbore parameter; and creating the neural network model by using the plurality of values for the at least one wellbore parameter and the plurality of output values for the at least one tool parameter obtained by using the preexisting model. The apparatus may further include a processor that is configured to determine a value of the tool operating parameter using the neural network model during drilling of the wellbore. The processor may be configured to alter the force applied by the force application device to cause a change in drilling direction in response to the value of the tool operating parameter determined by using the neural network model. The force application device may be configured to apply force onto a wall of the wellbore during drilling of the wellbore to change drilling direction. The operating property of the tool may be, but is not limited to: (i) bending moment: (ii) stress; (iii) vibration; (iv) whirl; (v) stick-slip; (vi) oscillation; (vii) deflection; (viii) tilt; (ix) natural frequency; (x) tool fatigue; and (xi) tool health. The apparatus may further include a drilling motor that rotates a drill bit for drilling the wellbore and a measurement-while-drilling device for estimating a property of a formation surrounding the wellbore. The measurement-while-drilling device may be any suitable device, including, but not limited to: (i) a resistivity device; (ii) an acoustic device; (iii) a nuclear device; (iv) a nuclear magnetic resonance device; and (v) a formation testing device. The processor of the apparatus may be located in the drilling assembly and/or at the surface. The processor may further be configured to cause altering an operation of the tool based on the value of the tool operating parameter determined using the neural network model. The tool operation may include, but is not limited to: (i) drilling direction; (ii) force applied on a wellbore inner surface by a force application device to drill the wellbore along a desired path; (iii) weight on bit; (iv) speed of a drilling bit; (v) rotational speed of a drill string; and (vi) mud motor speed; (vii) inclination; (viii) azimuth; and (ix) orientation. The term drilling assembly or BHA parameters are used herein for ease of explanation. The methods and apparatus described herein equally apply to any downhole tool or device used in a wellbore during drilling of the wellbore.

The foregoing description is directed to particular embodiments of the present disclosure for the purpose of illustration and explanation. It will be apparent, however, to one skilled in the art that many modifications and changes to the embodiment set forth above are possible without departing from the scope and the spirit of the disclosure. It is intended that the following claims be interpreted to embrace all such modifications and changes.

The invention claimed is:

1. A method of operating a tool in a wellbore, comprising:
defining at least one value of at least one tool parameter,
defining a plurality of values of at least one wellbore parameter,
using the at least one value of the at least one tool parameter and the plurality of values of the at least one wellbore parameter as inputs to a selected model to estimate a bending moment of the tool;
obtaining an expected value of the bending moment by inputting into the neural network model the defined plurality of values of the at least one wellbore parameter and the estimated bending moment of the tool; and
comparing the expected value of bending moment of the tool obtained from the neural network model to the estimated bending moment of the tool obtained from the selected model to train the neutral network;
using the obtained neural network model to operate the tool in the wellbore.

2. The method of claim 1, wherein the at least one tool parameter is selected from a group consisting of: (i) a length; (ii) a weight; (iii) a weight distribution; (iv) a diameter; (v) an outside dimension profile of the tool; and (vi) a material.

3. The method of claim 1, wherein the at least one wellbore parameter is selected from a group consisting of: (i) inclination; (ii) wellbore geometry; (iii) azimuth; (iv) wellbore inside dimension; and (v) curvature.

4. The method of claim 1, further comprising determining as an output value at least one tool operating parameter selected from a group consisting of: (i) stress; (ii) vibration; (iii) whirl; (iv) stick-slip; (v) oscillation; (vi) deflection; (vii) tilt; (viii) natural frequency; (ix) tool fatigue; and (x) tool health.

5. The method of claim 4 further comprising:
estimating the output value of the at least one tool operating parameter when the tool is in use in the wellbore ("in-situ value") using as input a value of the wellbore parameter into the neural network; and
altering a tool operation in response to the in-situ value when the tool is in the wellbore.

6. The method of claim 1, wherein obtaining the neural network model further comprises using as input a value of at least one dynamic drilling parameter.

7. The method of claim 6, wherein the at least one dynamic drilling parameter is selected from a group consisting of: (i) a side force applied by the tool to the wellbore; (ii) direction of a side force applied by the tool to the wellbore; (iii) stiffness of the tool; (iv) weight-on-bit; (v) rotational speed of a drill bit; and (vi) rotational speed of the tool.

8. The method of claim 1 further comprising:
obtaining a value of the bending moment using the neural network model during drilling of the wellbore; and
altering a tool operation during drilling of the wellbore when the obtained value of the bending moment using the neural network is outside a selected criterion.

9. The method of claim 8, wherein altering the tool operation comprises altering at least one: (i) drilling direction; (ii) force applied on an inner wall of the wellbore by a force application device; (iii) weight-on-bit; (iv) rotational speed of a drilling bit; (v) rotational speed of a drill string; (vi) drilling motor rotational speed that drives a drill bit; (vii) inclination; (viii) azimuth; and (ix) orientation.

10. The method of claim 1 further comprising: obtaining a value of the bending moment when the tool is in use in the wellbore ("in-situ value") using as input a value of a wellbore parameter into the neural network;
obtaining an actual value of the bending moment using a sensor downhole; and
updating the neural network model using the obtained actual value of the bending moment.

11. The method of claim 1, wherein the at least one value of the at least one tool parameter is fixed and the plurality of values of the at least one wellbore parameter falls within a selected range of values.

12. The method of claim 1 further comprising using at least one value of at least one dynamic drilling parameter as an input to the selected model to obtain the bending moment.

13. An apparatus for use in a well bore, comprising:
a drilling assembly configured to drill the wellbore;
a data storage medium;
a neural network model stored in the data storage medium, which neural network model is created by:
obtaining a bending moment of the drilling assembly by using as input to a selected model at least one value of at least one tool parameter and a plurality of values of at least one well bore parameter, and
obtaining an expected value of the bending moment of the drilling assembly by inputting into the neural network model the plurality of values of the at least one well bore parameter and the estimated bending moment of the drilling assembly, and
comparing the expected value of the bending moment of the drilling assembly obtained from the neural network model to bending moment of the drilling assembly obtained from the selected model to train the neural network; and
a processor configured to use the trained neural network to operate the drilling assembly in the wellbore.

14. The apparatus of claim 13 wherein the processor is further configured to determine the value of the bending moment of the drilling assembly using the neural network model during drilling of the wellbore.

15. The apparatus of claim 14 further comprising a force application device that is configured to apply force onto a wall of the wellbore during drilling of the wellbore to change drilling direction.

16. The apparatus of claim 15, wherein the processor is further configured to alter the force applied by the force application device to cause a change in drilling direction in response to the value of the bending moment of the drilling assembly determined by using the neural network model.

17. The apparatus of claim 13, wherein the processor is further configured to determine an output value of an operating property of the tool selected from a group consisting of: (i) stress; (ii) vibration; (iii) whirl; (iv) stick-slip; (v) oscillation; (vi) deflection; and (vii) tilt.

18. The apparatus of claim 13 further comprising a drilling motor that rotates a drill bit for drilling the wellbore.

19. The apparatus of claim 13 further comprising a measurement-while-drilling device for estimating a property of a formation surrounding the wellbore.

20. The apparatus of claim 19, wherein the measurement-while-drilling device is selected from a group consisting of: (i) a resistivity device; (ii) an acoustic device; (iii) a nuclear device; (iv) a nuclear magnetic resonance device; and (v) a formation testing device.

21. The apparatus of claim 13, wherein the processor is located at one of: (i) in the drilling assembly; and (ii) at the surface.

22. The apparatus of claim 13, wherein the processor is configured to cause altering an operation of the tool based on the value of the bending moment of the drilling assembly determined using the neural network model, which tool operation is selected from a group consisting of: (i) drilling direction; (ii) force applied on a wellbore inner surface by a force application device to drill the wellbore along a desired path; (iii) weight on bit; (iv) speed of a drilling bit; (v) rotational speed of a drill string; and (vi) mud motor speed; (vii) inclination; (viii) azimuth; and (ix) orientation.

* * * * *